United States Patent [19]

Chupin et al.

[11] Patent Number: 4,918,778
[45] Date of Patent: Apr. 24, 1990

[54] ENDLESS ROTARY BAND CLEANING DEVICE, PARTICULARLY FOR CLEANING A CONVEYOR BELT OR SUPPORTING SURFACES OF OBJECTS

[75] Inventors: Guillaume Chupin, Versailles; Denis Dandeville, Mantes la Ville, both of France

[73] Assignee: VIFE, Versailles, France

[21] Appl. No.: 258,271

[22] Filed: Oct. 14, 1988

[30] Foreign Application Priority Data

Oct. 16, 1987 [FR] France .................................. 87 14869

[51] Int. Cl.⁵ .............................................. B08B 1/02
[52] U.S. Cl. ...................................... 15/97 R; 15/3.1; 15/3.21; 15/21 R; 15/36; 15/102; 198/494
[58] Field of Search ..................................... 15/3.1–3.19, 15/3.21, 21 R, 21 A, 51, 97 R, 99, 36, 102; 194/494, 495, 496, 497

[56] References Cited

U.S. PATENT DOCUMENTS 4,073,376 2/1978 Krooss .............................. 15/97 R

FOREIGN PATENT DOCUMENTS 0914432 3/1982 U.S.S.R. .............................. 198/495

*Primary Examiner*—Edward L. Roberts
*Attorney, Agent, or Firm*—William A. Drucker

[57] ABSTRACT

The invention provides an endless rotary band cleaning device comprising an endless cleaning band mounted on three rollers disposed parallel to each other, namely: a drive roller, a guide roller and a secondary roller disposed in the space between the other two rollers. These rollers are arranged so that the lower part of the band follows a sinuous path comprising an upgoing path in which the band is washed and a downgoing path after which the band is impregnated with cleaning liquid. The upper part of the band situated between the drive roller and the guide roller serves as cleaning area.

14 Claims, 1 Drawing Sheet

ENDLESS ROTARY BAND CLEANING DEVICE, PARTICULARLY FOR CLEANING A CONVEYOR BELT OR SUPPORTING SURFACES OF OBJECTS

BACKGROUND OF THE INVENTION

1. Field of the Invention

The present invention relates to an endless rotary band cleaning device usuable more particularly, but not exclusively, for continuously cleaning a conveyor belt serving for handling objects or products.

2. Description of the Prior Art

Generally, in this type of application, there has already been proposed, particularly in Patent No. DE-2 950 346, an installation for cleaning conveyor belts including a rotary cleaning band mounted on two rollers of different diameters, the upper part of the cleaning and being held applied against the conveyor belt, whereas its lower part plunges, at the level of the largest diameter roller, in a tank fed with a cleaning liquid. This cleaning tank is extended by a draining tank which extends below the smallest diameter roller with which a squeezer roller is associated.

Thus, the cleaning band, driven by the largest diameter roller, passes successively through the cleaning band, then rises as far as the smallest diameter roller where it is squeezed, then comes back to the largest diameter roller while being applied against the conveyor belt, in a direction opposite the direction of movement thereof.

The cleaning liquid extracted from the cleaning band by the squeezer roller falls into the draining tank and is then discharged. In use this type of installation has proved to have a number of drawbacks.

In particular, the cleaning liquid contained in the cleaning tank, in which the soiled part of the belt plunges, will be continuously soiled and will therefore have to be renewed permanently. This consumption will be further increased by the amount of liquid extracted by the squeezer roller and which flows into the draining tank.

To these drawbacks is added the one resulting from the fact that in numerous applications the action of a single squeezer roller is insufficient for extracting all the impurities taken from the conveyor belt by the cleaning band. In this case, the cleaning band will bring back to the conveyor belt the fractions of these impurities which have not been extracted and the installation will become rapidly inefficient.

Of course, this type of problem also arises in the case where an installation of this kind is used for the cleaning of objects which are caused to travel past on the cleaning band at a speed different from that of said band.

The purpose of the invention is then to overcome these drawbacks.

SUMMARY OF THE INVENTION

For this it provides a cleaning device in which the endless cleaning band is mounted on at least three rollers disposed parallel to each other, namely: two main rollers of substantially equal diameters, one at least of which is driven in rotation and at least a second roller, of smaller diameter, disposed in the space between the two main rollers, these three rollers being adapted so that the cleaning band follows, in its upper part, a rectilinear path going from the first to the second main rollers while forming a cleaning surface for the objects or for the belt which it is desired to clean Then, in its lower part, a sinuous path comprising two portions situated on each side of said secondary roller, namely: an upstream portion situated on the same side as the second main roller, in which the band is continuously washed through the action of washing means and a downstream zone situated on the sane side as the first main roller, at the level of which the band receives a cleaning liquid which will then serve for said cleaning.

This device may further advantageously comprise a first squeezer roller acting on the band at the level of the second roller, so as to extract the washing liquid remaining on the band and a second squeezer roller applied to the band portion passing over the first main roller. Similarly, two tanks may be disposed respectively under the band in the washing and cleaning liquid application zones for separately collecting the liquids used in these two zones.

In a particularly advantageous embodiment of the invention, the cleaning device comprises a secondary roller serving as tensioning roller, this secondary roller being disposed between the two main rollers so that the lower part of the band follows a sinuous path comprising a rising path between the second main roller and the tensioning roller and a downward path going from the tensioning roller to the first main roller.

In this case, said cleaning liquid tank will be disposed so that the first main roller is partially immersed in the liquid contained in this tank and so that it may collect the liquid extracted by the second squeezer roller.

Similarly, the washing tank may contain a washing liquid in which the lower part of the second main roller plunges.

However, it should be noted that the washing means may comprise a washing liquid injection ramp, providing a succession of jets under pressure on the upward path of the band. In this case, the washing tank may consist of a draining tank.

Of course, in the case where this device is applied to the cleaning of a conveyor belt, the upper face of the cleaning band which forms the cleaning surface is held applied against the conveyor belt and is driven so as to travel at a speed different from that of the conveyor belt. However, the invention is not limited to this type of application.

As mentioned above, an object of the invention is also to solve the problems related to the continuous cleaning, using a device of the above described kind, of supporting surfaces of objects transported by one or more conveyors.

For such cleaning, two techniques are used at the present time;

The first of these techniques consists in channelling the flow of objects travelling on a conveyor so as to bring them on to the cleaning band of a device of the above described kind, disposed on one of the lateral sides of the transporter. In this case, the objects, pushed by others, are caused to travel over the band in a direction opposite its travelling direction, so that they undergo intense rubbing on their bottom, support surface, which produces cleaning. The objects are then brought back on to the belt after being cleaned.

The second technique consists in placing the cleaning device between two conveyors disposed end to end, one of these conveyors bringing the dirty objects on to the cleaning band, whereas the other is intended to recover these objects once cleaned.

These two above techniques have however a number of drawbacks.

Because they travel in a direction opposite the advancing direction of the conveyor, when passing over the band, the objects will be braked, even stopped suddenly, until they are pushed by the following objects. This causes then a phenomenon of accumulation and considerable shocks between the objects thus immobilized or braked and the new objects arriving at the speed of the conveyor in the zone of accumulation. There is then a great risk of damage to the objects which is inadmissible, particularly when these objects are fragile and are formed for example by glass containers.

Furthermore, the braking caused by the cleaning band leads to considerably limiting the travel speed of the conveyor and consequently its output.

The first solution has the further drawback that the objects once cleaned are brought back on to the same conveyor. It is clear in fact that the band portion on to which the objects are brought back risks being soiled by the objects present before cleaning and that, consequently, these objects risk being again soiled.

The second solution does not have this drawback since the objects are brought back on a second conveyor which may be constantly cleaned. However, this solution remains expensive and is therefore frequently discarded.

An object of the invention is also to overcome these drawbacks.

It proposes a cleaning device comprising, in a way similar to that described above, an endless cleaning band mounted between at least two rollers, the upper part of which between these two rollers forms a cleaning area for the objects and whose lower part is continuously cleaned by cleaning means. This device further comprises means for transferring objects from a conveyor to the cleaning area, means for driving the cleaning band in the advancing direction of the objects but at a higher speed, and deflection means extending over said cleaning area so as to slow down the advance of the objects and guide them towards an outlet area of the device.

Advantageously, the above defined device will be placed against a longitudinal edge of the conveyor and will comprise, upstream of the cleaning area, an accumulation area into which the objects coming from the conveyor will be transferred, through transfer means, and will be temporarily stocked. This accumulation area then has an outlet giving on to the cleaning area at a position relatively distant from the edge of the cleaning band adjacent the conveyor. Said deflection means then extend obliquely with respect to the longitudinal axis of the cleaning band from the outlet of the accumulation device as far as an outlet area situated on the conveyor, downstream of said transfer device.

In the case where the conveyor consists of a belt transporter, for preventing the objects once cleaned from being soiled again by the belt, the device may further comprise cleaning means acting on the belt between the zone of transfer of the objects to the accumulation area and the outlet area of the cleaning device.

These cleaning means become useless in the case where the conveyor is formed by two belt transporters disposed end to end and where the cleaning device is disposed at the junction between these two transporters.

BRIEF DESCRIPTION OF THE DRAWINGS

Embodiments of the invention will be described hereafter by way of non limiting examples with reference to the accompanying drawings in which.

DESCRIPTION OF THE PREFERRED EMBODIMENTS

Figure 1:
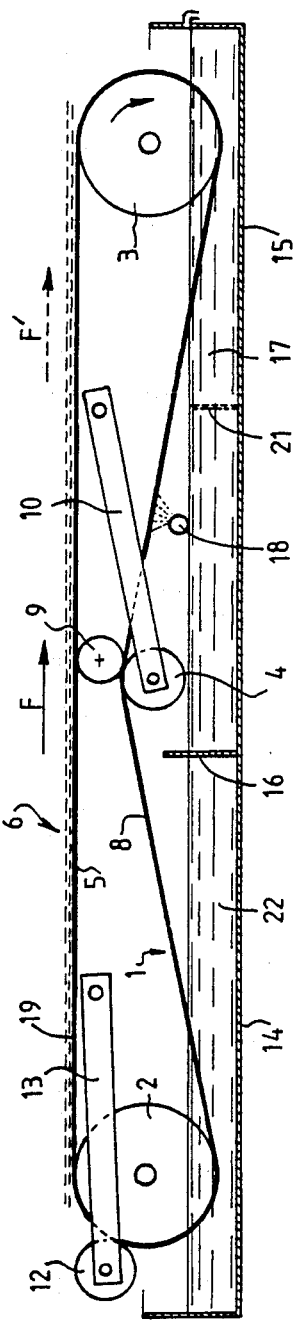
FIG. 1 is a schematic vertical sectional view of a cleaning device in accordance with the invention, usable for cleaning not only a conveyor belt but also the bottom support surfaces of objects.

In the example shown in FIG. 1, the cleaning device comprises an endless cleaning band 1 mounted on three rollers disposed parallel to each other, namely: two main rollers 2, 3 situated inside the loop formed by band 1 and a secondary roller 4 situated outside the loop, these three rollers 2, 3, 4 being adapted so that the band has, in its upper part, a rectilinear section 5, preferably horizontal forming a cleaning area 6 going from roller 2 to roller 3 and forms, in its lower part, a sinuous path comprising an upward path 7 between rollers 3 and 4 then a downward path 8 from roller 4 to roller 2.

In this example, the secondary roller 4 presses the band 1 against a roller 9 supporting the horizontal section 6, this assembly 4, 9 thus forming a device for squeezing the band.

The pressure at which the secondary roller 4 is applied against the support roller 9 may be adjusted because the secondary roller 4 is mounted on a pivoting structure 10 with an adjustable angular position.

Furthermore, on the portion of roller 2 covered by conveyor belt 1, a squeezer roller 12, also mounted on a pivoting structure 13, will come to bear.

The two main rollers 2, 3 are partially immersed in two respective tanks 14, 15 partially filled with liquid which extend in a volume situated in line with band 1. In this example, these two tanks 14, 15 are jointing and have a common wall 16 which extends transversely below the downward path 8 of band 1, in the vicinity of the secondary roller 4.

In the free volume between the surface of liquid 17 contained in tank 15 and the upward path 7 of band 1 there is further provided a washing ramp 18 whose function will be described further on.

In this figure, there has also been shown with broken lines, a fraction 19 of the lower part of the belt of a conveyor against which the cleaning area 6 of the device is applied, the latter of course being also able to serve for cleaning objects following a forced path over said cleaning band area 6.

The operation of the above described device is then the following:

Band 1, driven by roller 3 (coupled to a motor not shown), travels through the cleaning area 6 in the opposite direction to the travel direction F' of the fraction 19 shown of the belt of the conveyor. Thus, the cleaning band provides friction on the belt of the conveyor.

When it reaches roller 3, band 1 is therefore charged with impurities taken from the belt of the conveyor, and they should then be removed so that, at the level of roller 2, the cleaning band is continually clean.

For this, in the lower part of roller 3, band 1 plunges into the liquid 17 contained in the washing tank 15 where it begins to lose a fraction of its impurities. Such washing is then continued through the action of jets provided by ramp 18 which promotes the removal of impurities. It ends between rollers 4 and 9 by squeezing of band 1 which removes the liquid remaining on band 1 in which the rest of the impurities are dissolved and in suspension. The squeezed out liquid then falls into the washing tank 15 Because it is only a question of washing and because the liquid contained in the tank 15 undergoes decantation, this liquid does not require frequent renewal. For instance, it may consist of a mixture of water and a wetting agent. Moreover, a filter 21 may be advantageously interposed between the zone in which roller 3 plunges and the zone receiving the squeezed out liquid.

At the end of the downward path 8, band 1 thus washed and squeezed, plunges into the cleaning liquid 22 contained in tank 14 which may, for example, consist of a detergent liquid. This liquid 22, whose penetration inside band 1 is promoted by washing, is intended for the cleaning carried out at the cleaning surface of the band. This cleaning liquid absorption phase ends by the squeezing produced by the squeezer roller 12, after which band 1 is impregnated homogeneously and clean. The residual liquid produced by such squeezing drops back then into tank 14. It is clear that, because the band has been washed before reaching the impregnation zone, the cleaning liquid 22 will be less rapidly polluted and will not require frequent renewal.

As already mentioned, the device may serve for cleaning the bottom of objects transported by a conveyor.

Figure 2:
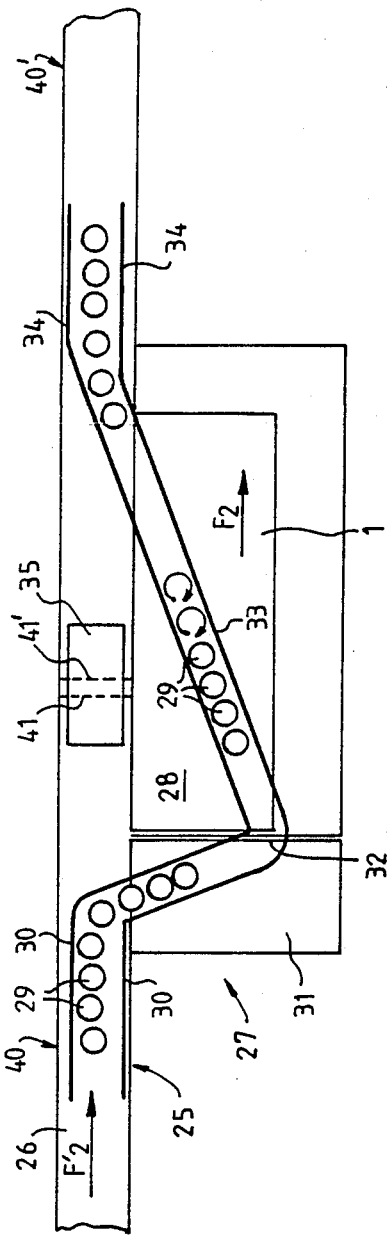
FIG. 2 is a top view of an apparatus for cleaning the bottom support surfaces of objects, equipping a conveyor.

For this, the device may be disposed against one longitudinal edges of a conveyor, as shown in the example illustrated in FIG. 2.

In this example, the conveyor consists of a belt transporter 26 and the cleaning device 27 is disposed so that the cleaning area 28 is directly adjacent belt 26 and at the same level, without interpositioning of any spacing element.

The access of the objects 29 conveyed by belt 26 of the conveyor on to the cleaning area 28 of device 27 is provided by transfer elementS, e.g. deflectors 30 and an accumulation table 31 whose exit 32 opens on to the inlet of the cleaning area 28 in a lateral region situated opposite belt 26 of the conveyor.

The deflection means 30 are then arranged so as to channel the objects 29 on to the accumulation table 31 without causing appreciable slowing down likely to generate impacts of objects 29 one against the other.

This accumulation table 31, which has been simply shown by a block, may be of a known type and will therefore not be described in detail.

At the outlet 32 of the accumulation table 31, the objects driven by the cleaning band 1, which then in the same direction ($F_2$) as the belt of the conveyor but preferably at a higher speed, are guided by an oblique deflection ramp 33 oriented towards belt 26. The objects 29 will then be caused to slide along this ramp 33 at a longitudinal speed less than that of the cleaning band 1. There will then follow a friction effect exerted by band 1 on the support surface of objects 29. Furthermore, in the case where objects 29 have a rounded base, they will be further subjected to a rotational movement around themselves because of the friction forces generated by ramp 33.

It should be noted that, because ramp 33 extends obliquely with respect to the advancing direction of the cleaning band 1, the action of the cleaning band 1 will take place transversely to the advance direction of objects 29. Thus, during their advance, objects 29 will be always cleaned by a clean zone of the cleaning band 1 and will not receive the impurities extracted from another previously cleaned object 29.

The return of the cleaned objects 29 on to belt 26 of the conveyor is caused by deflectors 34 situated at the end of ramp 33. Preferably, the travel speed of the cleaning band 1 will be adjusted so as to obtain an advancing speed of objects 29 substantially equal to the travel speed of the belt 26 of the conveyor.

It is clear that such cleaning apparatus 27 will only be fully efficient if the objects 29, once cleaned, are brought back on to a clean transporter belt, which is not the case if the belt is used which has already served for transporting the objects alone.

This is why the invention further provides an additional cleaning system 35 of conventional type, for example comprising rotary brushes, for cleaning the transporter belt 26 between the transfer means 30 situated upstream and the downstream deflectors 34.

It is clear that in the case where the conveyor is formed of two transporter belts 40, 40' disposed end to end and where the cleaning device 27 is placed at the junction between the two belts 40, 40', the additional cleaning system 35 is not necessary since, at the outlet of the cleaning device 27, the objects 29 will be transferred to a clean transporter belt 40'.

This arrangement is illustrated in FIG. 2, in which the broken lines 41, 41' indicate the junction zone between the two transporter belts 40, 40' which occupy the position of the transporter belt 26.

What is claimed is:

1. An endless rotary band cleaning device, wherein the endless cleaning band is mounted on at least three rollers disposed parallel to each other, namely: two main rollers one at least of which is driven in rotation and a secondary roller disposed in the space between the two main rollers, these three rollers being adapted so that the cleaning band follows, in its upper part, a rectilinear path going from the first to the second main roller while forming a cleaning surface then, in its lower part, a sinuous path comprising two portions situated on each side of said secondary roller, namely:
   (i) an upstream portion which extends between the second main roller and the secondary roller, in which the band follows an upgoing course in a first zone and is continuously subjected to a washing with a washing liquid, and
   (ii) a downstream portion which extends between the secondary roller and the first main roller, and in which the band follows a downgoing course in a second zone and is impregnated with a cleaning liquid for carrying out said cleaning.

2. The device as claimed in claim 1, further comprising a first squeezer roller applied against a band portion passing over the first main roller.

3. The device as claimed in claim 1, further comprising a second squeezer roller acting on the band at the level of the secondary roller, so as to extract the washing liquid remaining on the band.

4. The device as claimed in claim 1, further comprising two tanks, namely: a cleaning liquid tank and a washing liquid tank, respectively disposed under the upstream portion and the downstream portion, for separately collecting said liquids.

5. The device as claimed in claim 1, wherein said cleaning liquid tank is disposed so that the liquid contained in this tank and so that it may collect the liquid extracted by the first squeezer roller.

6. The device as claimed in claim 4, wherein said washing tank contains a washing liquid in which a lower part of the second main roller plunges.

7. The device as claimed in claim 1, which comprises a washing liquid injection ramp providing a succession of jets on the upgoing course of the cleaning band.

8. The device as claimed in claim 1, wherein, in the case where it serves for cleaning a transporter belt, the upper face of the cleaning band which forms the cleaning surface is held applied against the transporter belt and is driven so as to have a travel speed different from that of the transporter belt.

9. The device as claimed in claim 1, wherein, in the case where it is used for cleaning the bottom support surfaces of objects, it further comprises means for forcing said objects over said cleaning surface at a speed different from that of said cleaning band.

10. The device as claimed in claim 9, wherein said objects come from a conveyor having a determined travel direction, further comprising means for transferring the objects from the conveyor to the cleaning surface, means for driving the cleaning band in the travel direction of the conveyor, but at a speed preferably greater than that of said conveyor, and deflection means extending over said cleaning surface so as to slow down the advance of the objects and guide them towards an exit area from the device.

11. The device as claimed in claim 10, wherein said transfer means comprise an area for accumulating the objects.

12. The device as claimed in claim 11, wherein the exit from the accumulation area opens on to the cleaning surface at a position relatively removed from the edge of the cleaning surface adjacent the conveyor, and said deflection means extend obliquely with respect to the longitudinal axis of the cleaning band from said exit as far as an exit area situated on the conveyor, downstream of said transfer means.

13. The device as claimed in claim 12, further comprising means for cleaning the conveyor, said cleaning means being disposed in the gap between said transfer means and said exit area.

14. The device as claimed in claim 12, wherein said conveyor is formed of two belt transporters disposed end to end, namely: an upstream transporter and a downstream transporter and said cleaning surface is situated in a junction zone located between these two transporters, so that said transfer means cooperate with the upstream transporter and said exit area is situated on the downstream transporter.

* * * * *